Feb. 14, 1956  R. E. PAYNE  2,734,735
AUTOMATIC WEIGHING SCALE
Original Filed Aug. 15, 1947  2 Sheets-Sheet 1
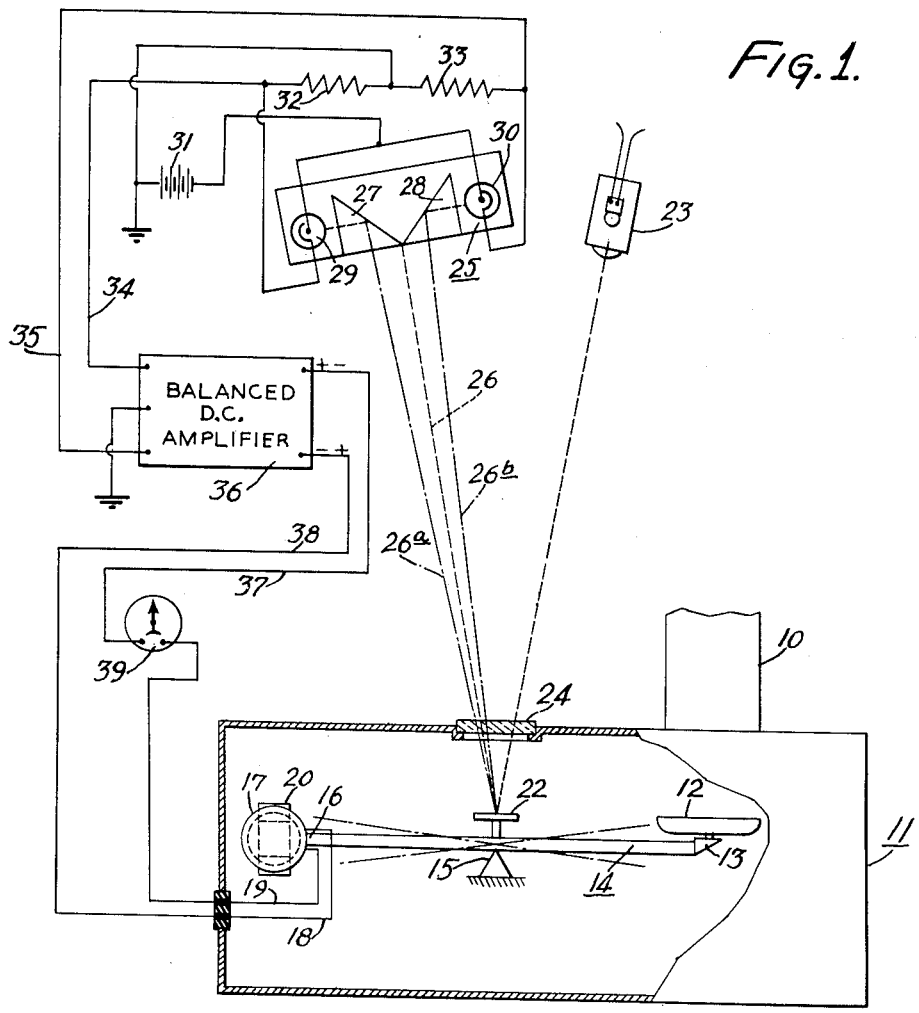
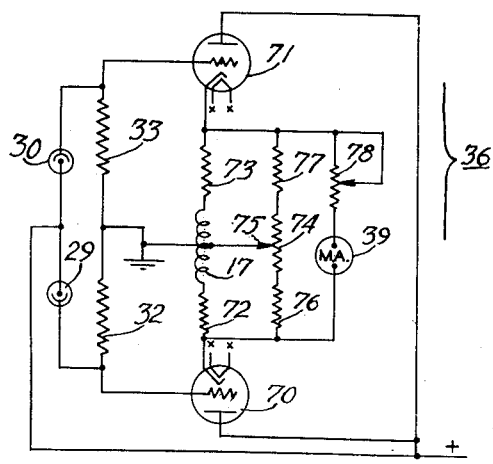
Inventor:
Robert E Payne
by his Attorney
Hugo A Kemman Feb. 14, 1956 R. E. PAYNE 2,734,735
AUTOMATIC WEIGHING SCALE
Original Filed Aug. 15, 1947 2 Sheets-Sheet 2
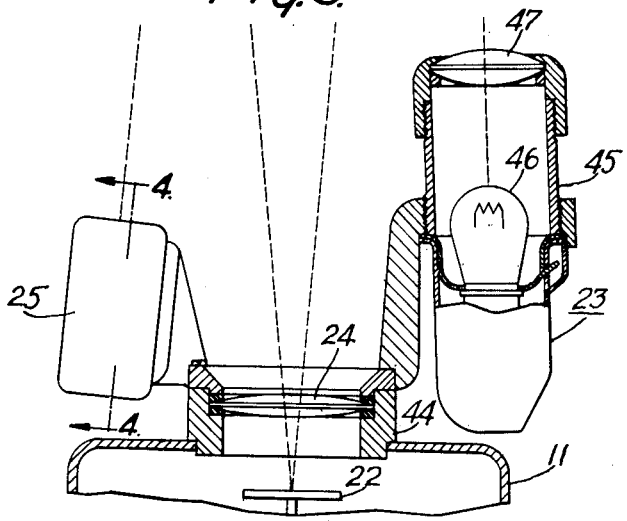
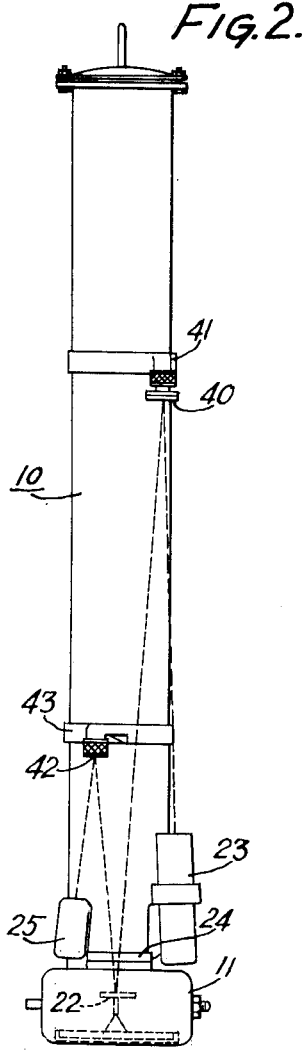
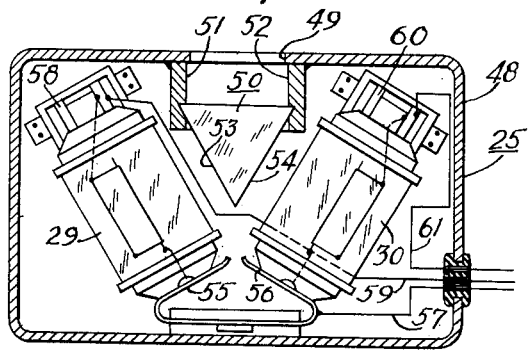
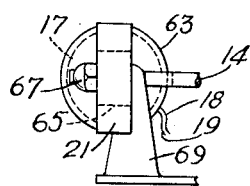
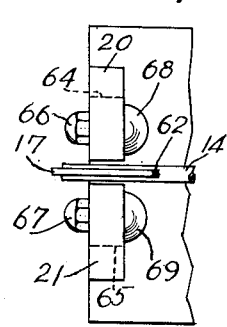
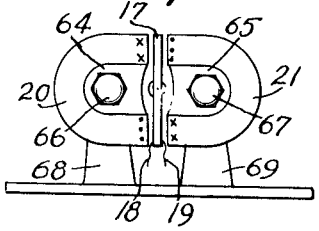
Inventor:
Robert E. Payne
by his Attorney
Hugo G. Fenman

United States Patent Office 2,734,735
Patented Feb. 14, 1956

2,734,735

AUTOMATIC WEIGHING SCALE

Robert E. Payne, Gladwyne, Pa., assignor to The Sharples Corporation, a corporation of Delaware Original application August 15, 1947, Serial No. 768,907, now Patent No. 2,597,899, dated May 27, 1952. Divided and this application March 19, 1952, Serial No. 277,444

1 Claim. (Cl. 265—70)

This invention relates to systems for measuring varying forces, especially where minute forces are involved and great sensitivity and accuracy are required. The invention is particularly applicable to apparatus for analyzing powdered or finely divided material by determining its particle size distribution, as disclosed in my copending application Serial No. 768,907, filed August 15, 1947, now U. S. Patent No. 2,597,899 dated May 27, 1952, of which this application is a division.

The principal object of the present invention is to provide an improved force measuring system which is extremely sensitive to applied forces and which is capable of accurately measuring very small forces.

Another object of the invention is to provide such a system which operates by differential activation of a pair of light-sensitive devices to produce a substantial electrical effect in response to an applied force.

By way of example, the invention is illustrated in the accompanying drawings as applied to an apparatus for determination of particle size distribution of finely divided material, as disclosed in the aforementioned patent. As applied to such apparatus, the present invention serves to measure the varying force produced by material particles settling downward through a sedimentation tower onto a collecting pan of a fulcrumed balance member. It is to be understood, however, that the invention is not limited to such application but may be used generally for measurement of forces wherever it is applicable.

In the accompanying drawings,

Fig. 1 is a diagrammatic illustration of one embodiment of the invention applied to sedimentation apparatus of the character disclosed in the aforementioned patent;

Fig. 2 is a side elevational view of the apparatus insofar as it is necessary to show the same for the present purpose;

Fig. 3 is an enlarged view, partly in section, of the electro-optical arrangement employed;

Fig. 4 is a sectional view of the photo-electric cell assembly, taken along line 4—4 of Fig. 3;

Fig. 5 is a fragmentary side elevational view showing the restoring coil arrangement associated with the balance member;

Fig. 6 is a fragmentary plan view of the same;

Fig. 7 is an end elevational view of the same structure; and

Fig. 8 is a digrammatic illustration of one form of the electrical circuit which may be employed.

Referring first to Fig. 1 of the drawings, there is partially shown a sedimentation tower arrangement of the character above mentioned, which includes the tower 10 and a housing or enclosure 11 at the bottom thereof, within which is contained a weighing assembly including the collecting means 12 positioned to receive the particles settling through the tower 10. The collecting means 12 is mounted upon one end 13 of a lever arm 14 pivoted at the fulcrum 15. The opposite end 16 of the lever arm 14 is provided with a restoring torque coil 17 having flexible electrical connections 18 and 19 which pass through the housing 11 in pressure tight relation. The fulcrum 15, shown diagrammatically in Fig. 1, may be of the type shown in the above-mentioned patent comprising a torsion wire.

The restoring torque coil 17 is positioned with its axis in an approximate horizontal plane and its coil faces between the opposed and opposite polarity pole faces of a pair of permanent magnets 20 and 21, as clearly shown in Fig. 7, only one of the magnets being shown in Fig. 1. A light reflecting mirror 22 is mounted upon the lever arm 14 in the vicinity of fulcrum 15 to be deflected with the lever arm 14 as it is moved toward either of the dotted line positions in response to the application of forces to the lever arm. It should be understood that the dotted line positions of the lever arm 14 are greatly exaggerated in the particular apparatus shown, since the amount of deflection of the lever arm due to the accumulation of particles on the collecting means 12 is practically imperceptible to the eye and it is for this reason that a very accurate sensing and measuring system is required. The servo system presently to be described serves to supply an electrical signal to the coil 17, which in conjunction with its associated magnets applies a restoring force to the lever arm 14 to restore its equilibrium position.

In the diagrammatic illustration of Fig. 1, a light source 23 is adapted to project a beam of light through the transparent window or lens 24 on to the mirror 22, which reflects the beam of light toward the photo-cell assembly 25 according to the instantaneous position of lever arm 14. The equilibrium position of the reflected light beam is indicated at 26, while deflected positions of the beam are represented at 26a and 26b. The relative positions of the light source 23 and the reflecting mirror 22 may be such that when the lever arm 14 is in the horizontal equilibrium position, the reflected light beam 26 is evenly divided by the prisms 27 and 28 between the photo-electric cells 29 and 30. Upon movement of the lever arm from the equilibrium position, the light falling on one cell will increase while the light falling on the other cell will decrease, depending upon the direction of deflection. Thus, the photo-electric cells will be differentially activated according to the movement of lever arm 14 from its equilibrium position.

The photo-electric cells 29 and 30 are connected in a circuit with their anodes connected together and to the positive terminal of a unidirectional voltage source 31 such as a battery. The negative terminal of source 31 is grounded and is connected to the junction of two equal resistors 32 and 33 whose outer extremities are connected respectively to the cathodes of the photo-electric cells and are also connected over conductors 34 and 35 to the ungrounded input terminals of a balanced D. C. amplifier 36. It will be noted that the photo-electric cells 29 and 30, and the resistors 32 and 33 are arranged in an electrical network to which a unidirectional voltage from source 31 is applied, and in which the photo-electric cells are in electrical opposition to one another. When a balanced condition of the network exists, i. e., when the light falls equally on the photo-electric cells, equal voltages with respect to ground appear on conductors 34 and 35, and such voltages are applied to the input of the amplifier 36. The balanced amplifier may be of any well known type, an example of which is shown in Fig. 8 to be described later. In the balanced condition of the controlling electrical network, the input voltages to the amplifier will cancel one another and will produce no output. In response to unbalance of the controlling network, the opposing voltages applied to the amplifier 36 will be varied differentially according to the differential activation of the photo-electric cells 29 and 30, and the amplifier 36 will produce a voltage output of polarity and amplitude dependent upon the direction and extent of the differential variation of the applied voltages.

The output voltage from amplifier 36 is supplied over conductors 37 and 38 to the coil 17, thus creating a magnetic field to interact with the field of the permanent magnets and applying a restoring torque to the end of the lever arm 14 to restore its equilibrium position. In effect, the amplifier 36 functions as an impedance matching device between the relatively high impedance of the photo-cells and the low impedance of the restoring torque coil and supplies the necessary restoring torque power.

Although the electro-optical servo system, as diagrammatically illustrated and described thus far, is of the type in which the lever arm 14 may be balanced in a horizontal equilibrium position without the application of any electro-magnetic restoring torque or energy in the coil 17, it should be apparent that the system is not necessarily limited to such an arrangement. For example, the fulcrum point 15 may be located at a position other than the center of gravity of the lever arm 14, in which case the servo system may be modified to provide a continuous torque through the medium of the coil 17 and associated permanent magnets to maintain the lever arm 14 in a desired equilibrium position prior to application of force to be measured.

A meter 39 may be provided in the output circuit of the amplifier 36 to indicate the magnitude and sense of the restoring force which, of course, is dependent upon the current supplied to the coil 17. The meter 39 may be of the micro-ammeter type serially connected in the circuit to measure the current, but it should be understood that any type of device connected to measure electrical current or voltage may be used to indicate the restoring torque energy. By way of example, as applied to an apparatus of the character above mentioned, the meter may be calibrated arbitrarily from zero to 100, since its deflection is only an arbitrary indication of the amount or percentage weight of particles collected in the collecting means 12 during any interval of time from start to finish of the operation. The meter may also be calibrated directly in milligrams indicative of the weight on the collecting means 12, if so desired. If desired, a continuous recording meter may be employed.

Referring now to Figs. 2 and 3, there is shown an arrangement which may be employed in conjunction with the settling tower 10 and the enclosure 11 at the bottom thereof. In this arrangement the light source assembly 23 and the photo-cell assembly 25 are mounted on the top of the substantially rectangular housing 11 adjacent the tower 10. A mirror 40 is mounted upon a bracket 41 supported upon the sedimentation tower 10 to reflect the light beam from the light source downward through the window 24 of the housing 11 on to the light reflecting mirror 22. The latter reflects the light beam upward to a mirror 42 supported by a bracket 43 upon the tower 10. The mirror 42 reflects the light beam downward to the photo-cell assembly 25.

As shown in Fig. 3, the top of the rectangular housing 11 is provided with a top opening within which is welded, in pressure tight relation, the lens support 44. The light source assembly 23 comprises an opaque casing 45, a lamp 46 therein, and a lens 47 for focusing the light beam upon the mirror 40.

As shown in Fig. 4, the photo-cell assembly 25 comprises an opaque casing 48 having an opening 49 to receive the light beam, a prism 50 arranged to receive the light beam, and the photo-cells 29 and 30. The prism 50 is supported by supports 51 and 52 welded to the casing 48. The photo-cells 29 and 30 are supported with their light-sensitive surfaces parallel to the adjacent prism sides 53 and 54, respectively. The anodes of the photo-cells are connected to spring supporting clips 55 and 56 which are electrically connected together and to a conductor 57. The cathode of photo-cell 29 is engaged by a spring supporting clip 58 which is electrically connected to a conductor 59. Similarly, the cathode of photo-cell 30 is engaged by a spring supporting clip 60 which is connected to a conductor 61. The conductors 57, 59 and 61 extend through a pressure tight bushing in the wall of casing 48.

It will be seen that if the light beam entering opening 49 strikes the prism 50 in its exact center, the light will be evenly distributed to the two photo-electric cells 29 and 30, producing equal potentials in conductors 59 and 61 with respect to conductor 57, assuming that a voltage source is connected to the photo-electric cells as in the arrangement of Fig. 1. While a preferred arrangement of photo-electric cells and light beam splitting prism is shown in Fig. 4, it should be understood that other arrangements may be used such as that shown diagrammatically in Fig. 1.

Referring now to Figs. 5 to 7, these figures show a suitable arrangement of the restoring torque coil 17 and the associated permanent magnets. As may be seen in Fig. 6, the end of lever arm 14 to which the coil 17 is to be affixed may be slotted as at 62 to receive the coil 17 and its supporting form member. The coil may be constructed in any suitable fashion and in the preferred embodiment the coil is wound within a peripheral slot of a plastic disk 63 (see Fig. 5) forming the coil support form. A thin disk of aluminum may be applied to one side of the coil to effect a damping action or the coil form itself may be formed of aluminum. The permanent magnets 20 and 21 are mounted, as shown, with their opposed pole faces of opposite polarity and with the coil 17 therebetween. The magnets may be supported in any suitable manner, such as by plastic inserts 64 and 65 having centrally located bores through which bolts 66 and 67 extend into engagement with pedestal supporting members 68 and 69. The leads 18 and 19 extending from the coil may be very fine diameter wires.

Referring now to Fig. 8, there is shown one form of device which is suitable for use as the balanced D. C. amplifier, i. e., the amplifier 36 in the overall system shown diagrammatically in Fig. 1. The circuit shown in Fig. 8 corresponds to that shown in Fig. 17 of the aforementioned patent. In Fig. 8 the network comprising photo-electric cells 29 and 30, and resistors 32 and 33 is the same as shown in Fig. 1. The anodes of the photo-electric cells are connected together and to the positive terminal of a unidirectional voltage source (not shown) whose negative terminal is connected to ground. The source may be a conventional voltage regulated D. C. power supply energized from a conventional alternating current source, as shown in the aforementioned patent, such power supply serving to rectify the alternating current as is well understood. The cathode of photo-electric cell 29, and the ungrounded end of resistor 32 are connected to the control grid of a triode vacumm tube 70. Similarly, the cathode of photo-electric cell 30, and the ungrounded end of resistor 33 are connected to the control grid of a triode vacuum tube 71. The resistors 32 and 33 serve as grid return resistors for the respective triodes. The plates, or anodes of triodes 70 and 71 are connected to the positive terminal of the voltage supply source. The output loading of the triodes is obtained in their cathode circuits, it being thus apparent that the tubes are connected in cathode follower circuits. In this form of amplifying circuit, the restoring torque coil 17 is center-tapped, the center-tap being grounded. The opposite ends of the coil are connected through resistors 72 and 73 to the respective cathodes of the triodes 70 and 71. A potentiomter 74 having a slider arm 75, grounded as shown, is connected between the cathodes of triodes 70, and 71, so that by adjusting the position of the slider arm 75 the opposing currents through the two halves of the coil may be made equal. Fixed resistors 76 and 77 are connected in series with the potentiometer resistance to obtain the desired total resistance in the circuit branch. The indicating meter 39, which may be a microammeter, is serially connected with an adjustable resistance 78 between the cathodes of the two triodes.

In the balanced condition of the system the cathodes of the two triodes have equal potentials and equal currents flow through the two halves of the coil 17. Unbalance of the system by differential activation of the photo-electric cells will cause equal and opposite changes in the potentials on the control grids of the two triodes, so that in the cathode follower circuits the cathode of each triode will assume a potential approximately that of its associated grid. Thus, a difference in potential will exist between the two cathodes, causing the currents flowing through the coil 17 to ground at the center point to be unequal and thus resulting in a net current flow within the coil in a direction to produce a restoring torque effective to restore the lever arm 14 to its equilibrium position. At the same time, the meter 39 is subjected to the potential difference between the two cathodes of the triodes 70 and 71, and the meter indicates such potential difference and, hence, the relative value of the restoring force. It will be apparent that the coil 17 must be connected in a manner to produce an electro-magnetic field of a polarity to produce the restoring torque, and that the resultant current flow in the coil 17 may be in either direction, depending upon the direction of unbalance of the system by a shift in light distribution between the two photo-electric-cells 29 and 30.

As pointed out in the aforementioned patent, the circuit just described is essentially an impedance matching device and does not provide for any voltage amplification of the voltage output from the network comprising the photo-electric cells. In such an arrangement, it is preferable to provide damping means in association with the restoring coil 17, as previously described, in order to prevent too quick a response of the restoring torque with relation to the movement of the lever arm 14.

When it is desired to use a device having voltage gain or amplification, the circuit shown in Fig. 18 of the aforementioned patent may be used, in which case it is unnecessary to use damping means in association with the restoring coil. In that circuit stabilization is effected through the use of a degenerative feed-back arrangement.

While the invention has been described with reference to the specific devices shown in the drawings, and as applied to a particular apparatus, it is to be understood that the invention is not thus limited but contemplates such embodiments and applications as may occur to those skilled in the art.

I claim:

Apparatus for measuring extremely small forces quickly and with a high degree of accuracy, comprising a balance member and a substantially frictionless fulcrum mounting therefor, said balance member being adapted to be actuated by very small forces applied thereto at one side of its fulcrum, a light reflector mounted on said balance member at the fulcrum thereof, means to project a beam of light onto said reflector, a pair of photo-electric devices arranged so as to receive equal amounts of the light of the reflected light beam when said balance member is in its equilibrium position and to receive greater and lesser amounts of light respectively when said balance member moves from the equilibrium position, an electrical network including said photo-electric devices in electrical opposition to one another for producing two unidirectional voltages which are equal when said balance member is in its equilibrium position and which become unequal when said member moves from said position according to the differential light activation of said photo-electric devices, a normally-balanced circuit including two grid-controlled electron tubes arranged in opposed relation to produce an output current of polarity and magnitude according to the relative magnitudes of voltages applied to the control grids of the tubes, connections for applying the aforementioned unidirectional voltages to said grids, whereby said circuit is caused to produce a unidirectional output current of polarity and magnitude according to the direction and magnitude of movement of said balance member from its equilibrium position, restoring means operable upon said balance member at the side of its fulcrum opposite the side at which the forces to be measured are applied, said restoring means comprising a coil and magnetic structure cooperatively associated with said coil to produce reactive force on the balance member upon flow of current in said coil, connections to effect flow of said output current in said coil to cause restoration of the balance member to its equilibrium position, and electrically-operable indicating means connected to the last-mentioned connections to give an indication representative of force being measured.

References Cited in the file of this patent

UNITED STATES PATENTS

| | | |
|---|---|---|
| 2,122,818 | Ladrach | July 5, 1938 |
| 2,156,895 | Godat | May 2, 1939 |
| 2,313,179 | Sprecker | Mar. 9, 1943 |
| 2,346,117 | Stabler | Apr. 4, 1944 |
| 2,371,040 | Fisher | Mar. 6, 1945 |
| 2,597,831 | Willis | May 20, 1952 |
| 2,598,812 | Marco | June 3, 1952 |

FOREIGN PATENTS

| | | |
|---|---|---|
| 816,908 | France | Aug. 20, 1937 |